United States Patent
Nonaka et al.

[11] Patent Number: 6,087,458
[45] Date of Patent: Jul. 11, 2000

[54] INITIATOR COMPOSITION FOR POLYMERIZING UNSATURATED MONOMERS

[75] Inventors: Shin-ichi Nonaka; Rainer B. Frings; Carola Jaroszewski; Gerwald F. Grahe, all of Berlin, Germany

[73] Assignee: Dainippon Ink and Chemicals, Inc., Tokyo, Japan

[21] Appl. No.: 09/016,414

[22] Filed: Jan. 30, 1998

[30] Foreign Application Priority Data

Jan. 31, 1997 [EP] European Pat. Off. ............. 97101532

[51] Int. Cl.[7] .................................. C08F 2/00; C08F 4/40; C08F 4/42; C08F 4/06
[52] U.S. Cl. ................. 526/89; 526/91; 526/92; 526/93
[58] Field of Search ................ 526/89, 93, 92, 526/91

[56] References Cited

U.S. PATENT DOCUMENTS 3,584,076  6/1971  Chetakian et al. ............... 260/863
5,451,644  9/1995  Fiarman et al. .................. 526/93

Primary Examiner—Necholus Ogden
Attorney, Agent, or Firm—Armstrong, Westerman, Hattori, McLeland & Naughton

[57] ABSTRACT

An initiator composition for polymerizing unsaturated monomers, comprising a component (A) which is a mixture of i) at least one salt of a metal in the second sub-group of the periodic table, optionally in solution in an aromatic solvent or in an $\alpha,\beta$-unsaturated ester, and ii) at least one salt of a metal in the seventh and eighth sub-group of the periodic table, optionally in solution in an aromatic solvent or in an $\alpha,\beta$-unsaturated ester; and a component (B) which is at least one organic peroxy ester, wherein the components (A) and (B) are kept separate from one another until they are brought together to initiate polymerization of the unsaturated monomers.

Also, polymerizable compositions containing the initiator composition together with polymerizable unsaturated monomers. The initiator composition can be used to homopolymerize and copolymerize various unsaturated monomers, such as methacrylic and acrylic acid esters, at lower temperatures.

43 Claims, No Drawings

INITIATOR COMPOSITION FOR POLYMERIZING UNSATURATED MONOMERS

BACKGROUND OF THE INVENTION

In industry, unsaturated monomers, preferably methacrylic or acrylic acid esters, styrene and mixtures thereof, are mainly polymerized with initiators which decompose on heating into free radicals which subsequently react with a respective monomer molecule and trigger radical chain polymerization.

The initiators are azo compounds such as azodiisobutyrodinitrile (AIBN), peroxy esters and diacyl peroxides such as dibenzoyl peroxide. The polymerization temperatures depend on the decomposition constants of the initiators. Usually a temperature of at least 60 to 70° C. is required. Since atmospheric oxygen reacts as a diradical with initiator radicals and growing polymer radicals and thus reduces the molecular weight of the polymers, polymerization using thermally activatable initiators must usually be carried out under oxygen-free conditions, e.g. in a protective gas atmosphere.

Homopolymerization and copolymerization of unsaturated monomers can be effected in bulk or in organic solvents or in aqueous emulsion or dispersion. Emulsion polymerization can also be carried out at 0 to 50° C., preferably at room temperature, if "redox initiators" are used. Initiating radicals are formed preferably by reduction of peroxy compounds such as $H_2O_2$, hydroperoxides or diacyl peroxides with oxidizing agents such as salts of transition metals, preferably salts of $Fe^{2+}$, $Co^{2+}$, $Ti^{3+}$, tertiary amines such as N,N-dimethylaniline, dimethylaminotoluidine or N,N-dimethylbenzylamine, sulphites such as $NaHSO_3$, sugars or ascorbic acid. Since the redox components are usually only soluble in water and radical formation also depends on the pH, their use is restricted mainly to aqueous systems.

Individual redox pairs such as $Co^{2+}$-carboxylate/hydroperoxide or diacyl peroxide/N,N-dimethylbenzylamine, are also suitable for crosslinking styrene solutions of unsaturated polymers containing fumarate and maleate groups at room temperature, and are used for example in the production of materials for jointless flooring. One disadvantage of these redox systems, however, is their sensitivity to oxygen, which increases the time taken by the surface to harden. This inhibition by oxygen can be partly prevented by addition of waxes, which float on the surface and thus form a barrier. Redox initiators of this kind can admittedly also be used for polymerization and crosslinking of acrylates and methacrylates, but in that case the polymerization or crosslinking are slower and less complete. Problems are caused both by inhibition by oxygen and by discoloration of the products. Also, individual redox components such as diacyl peroxides dissolve preferably in aromatic hydrocarbons such as styrene, and are difficult to dissolve in other monomers such as unsaturated esters.

Another possible method of room-temperature polymerization or crosslinking is photopolymerization. In this case the unsaturated monomers are mixed with radical initiators which have to be illuminated with UV before decomposing into polymerization-initiating radicals. Photopolymerization is also inhibited by oxygen.

Crosslinking of "alkyd" resins, made up of mono- or polyunsaturated fatty acids, polyols and cyclic anhydrides, is the only process which occurs in the presence of atmospheric oxygen even at room temperature. To this end, these lacquers are mixed with transition metal carboxylates, preferably $Co^{2+}$, $Zn^{2+}$, $Mn^{2+}$, $Pb^{2+}$ stearates or naphthenates, either singly or mixed in concentrations of 0.1 to 2 wt. %. Atmospheric oxygen causes hydroperoxides and peroxides to form on carbon atoms in the α-position relative to the double bonds of the unsaturated fatty-acid esters, and reacting in the presence of transition metal ions in a number of reactions involving crosslinking. A brief description of this so-called oxidative drying is given in Resins for Surface Coatings, Volume 1 (Ed. P. Oldring, G. Hayward), pages 52 ff (SITA Technology, London, 1987). However, this room-temperature crosslinking process in air is not a case of radical or ionic chain polymerization via double bonds.

SUMMARY OF THE INVENTION

The invention is based on the object of providing an initiator composition which homopolymerizes and copolymerizes all kinds of unsaturated monomers, including methacrylic and acrylic acid esters, at low temperatures, preferably 0 to 70° C., and particularly preferably at room temperature under aerobic conditions to form high-molecular weight products. Another aim is to crosslink polyfunctional derivatives under the specified conditions.

An initiator composition of this kind can be used for example to produce styrene-free jointless flooring, polymethyl methacrylate boards and molded parts by casting, resilient joints, lacquers which crosslink at room temperatures, or curing of adhesives.

Tests with the redox systems used for crosslinking unsaturated polyesters have shown that individual components such as dibenzoyl peroxide are difficult to dissolve in unsaturated esters and that polymerization or crosslinking occur very slowly, taking several days, and the molecular weights resulting from homopolymerization are very low.

It has now unexpectedly been found that mixtures containing one or more organic peroxy esters and combinations of salts of a divalent transition metal in the second sub-group of the periodic table (Group 2B) and a metal in the seventh (Group 7B) or eighth (Group 8B) sub-group of the periodic table can polymerize α,β-unsaturated monoesters such as methacrylic or acrylic acid esters and vinylesters at temperatures of 0 to 70° C., particularly advantageously at room temperature, in the presence of atmospheric oxygen. On the other hand mixtures of peroxy esters and a divalent transition metal salt from one of the said sub-groups are incapable of triggering polymerization of α,β-unsaturated monomers in the stated temperature range.

DETAILED DESCRIPTION OF THE INVENTION

The invention provides an initiator composition for polymerizing unsaturated monomers, comprising a component (A) which is a mixture of i) at least one salt of a metal in the second sub-group of the periodic table, optionally in solution in an aromatic solvent or in an α,β-unsaturated ester, and ii) at least one salt of a metal in the seventh or eighth sub-group of the periodic table, optionally in solution in an aromatic solvent or in an α,β-unsaturated ester; and a component (B) which is at least one organic peroxy ester, wherein the components (A) and (B) are kept separate from one another until they are brought together to initiate polymerization of the unsaturated monomers.

One essential component of the initiator composition according to the invention (component A) is a mixture of i) at least one salt of a metal in the second sub-group of the periodic table and ii) at least one salt of a metal in the seventh or eighth sub-group of the periodic table.

The salts of a metal in the second sub-group of the periodic table can be, for example, salts of zinc, cadmium or mercury, zinc salts being preferred. Although other salts such as fluorides, chlorides or bromides can be used, the preferred metal salts are carboxylates. The following are examples of suitable carboxylates of divalent metals in the second sub-group: acetates, propionates, butyrates, isobutyrates, 4-cyclohexyl butyrates, 2-ethyl hexanoates (octoates), neodecanoates, stearates and naphthenates, zinc carboxylates being preferred. For occupational health, $Zn^{2+}$ octoate and naphthenate are particularly preferred. $Zn^{2+}$ octoate is a specially preferred salt of the metal in the second sub-group.

The salts of the metal in the seventh or eighth sub-group in the periodic table can be salts of cobalt, manganese, iron, nickel or palladium, cobalt and manganese salts being preferred. As before, the carboxylates of these metals are the preferred metal salts.

The following are examples of suitable carboxylates of divalent metals in the seventh or eighth sub-group: acetates, propionates, butyrates, isobutyrates, 4-cyclohexyl butyrates, 2-ethyl hexanoates (octoates), neodecanoates or stearates, cobalt and manganese carboxylates being preferred. $Co^{2+}$ and $Mn^{2+}$ octoate and naphthenate are particularly preferred. $Co^{2+}$ and $Mn^{2+}$ octoate are the first choice. The naphthenates are mixtures of polycyclic aromatic carboxylic acids occurring in tar processing. These transition metal carboxylates can be used in solid form or as commercial solutions in aromatic solvents. The content of active substance, i.e. metal carboxylate, in these solutions is between 25 and 70 wt. %. It is advantageous to use solutions with the maximum content of active substance, in order to keep the content of aromatic solvent at a minimum.

The second essential component (B) of the initiator composition according to the invention is an organic peroxy ester. The following are examples of suitable peroxy esters: liquid peroxy esters of straight-chain and branched aliphatic, cycloaliphatic and aromatic peroxy carboxylic acids with tertiary alcohols. According to the invention the component (B) can contain one or more organic peroxy esters. The peroxy esters used according to the invention are usually commercial initiators for heat-activated radical polymerization. The following are examples: tert. butyl peroxybenzoate, tert. butylperoxy acetate, tert. butylperoxy isobutyrate, tert. butylperoxy diethyl acetate, tert. butylperoxy-3,5,5-trimethyl hexanoate, tert. butylperoxy pivalate, tert. amyl peroxy pivalate, ethyl-3,3-bis (tert.butylperoxy butyrate) and di-tert. butylperoxy tetrahydrophthalate. Preference is given, if only for safety reasons, to those peroxy esters having a 10-hour half-life temperature above 90° C. and which are stored at 20 to 30° C. Tert. butyl peroxybenzoate is particularly preferred since this peroxy ester, like all peroxy esters of aromatic carboxylic acids, is more active at room temperature than the corresponding esters of aliphatic carboxylic acids in the initiator composition according to the invention.

In one initiator composition according to the invention, the components (A) and (B) are spatially separate from one another, i.e. in the form of a "kit of parts". In the kit, the molar ratio of active substance (component (A)) to component (B) is 0.1 to 4, preferably 0.4 to 1.

In principle the molar proportions of the three components can vary within wide limits. In each case, the respective molar proportions determine the speed of polymerization and crosslinking.

For rapid, complete polymerization and crosslinking, the most favorable molar proportion is about 1.2 mole $Zn^{2+}/1.0$ mole $Co^{2+}/10$ mole peroxy ester. The $Co^{2+}$ carboxylate may also be replaced by equal quantities of $Mn^{2+}$ carboxylate.

The initiator composition according to the invention can advantageously be used for homo- and copolymerization of unsaturated monomers.

The invention therefore also relates to a polymerizable composition comprising a first component in the form of a mixture of i) at least one polymerizable unsaturated monomer, preferably an $\alpha,\beta$-unsaturated ester, ii) at least one salt of a metal in the second sub-group of the periodic table, and iii) at least one salt of a metal in the seventh or eighth sub-group of the periodic table; and a second component in the form of an organic peroxy ester, the first component (A) and the second component (B) being kept separate from one another until they are brought together to initiate polymerization of the unsaturated monomers.

The polymerizable composition according to the invention contains the previously described initiator composition in a total proportion of 0.05 to 5 wt. %, preferably 0.2 to 3 wt. % active substance relative to the monomer or monomers for polymerizing.

Polymerization of monofunctional monomers can advantageously be carried out in bulk or in polar solvents, the individual components of the initiator composition according to the invention being added to the monomer for polymerization in the following sequence: (i) metal salt in the second sub-group, particularly preferably the $Zn^{2+}$ salt, (ii) metal salt in the seventh or eighth sub-group, particularly preferably the $Co^{2+}$ salt or $Mn^{2+}$ salt, and (iii) peroxy ester. It is not necessary for the monomers or solutions thereof to be covered by an inert protective gas such as nitrogen or argon before or during polymerization. The polymerization temperature can be 0 to 70° C., preferably 20 to 40° C., the speed of polymerization increasing with increasing temperature. The resulting polymers have molecular weights of $10^4$ to $10^5$ g/mole.

The following are examples of suitable monomers for polymerization with the initiator composition according to the invention at temperatures between 0 and 70° C.: methacrylic and acrylic acid esters such as methyl, ethyl, n-, iso, sec, or tert. butyl methacrylate, 2-ethylhexyl, dodecyl, tridecyl or stearyl methacrylate, or the acrylates corresponding to these monomers or methacrylic and acrylic acid esters containing different aliphatic alcohol radicals from those mentioned, e.g. containing polyether, cycloaliphatic, fluoroalkylated, poly(dimethyl siloxane) or aromatic radicals. Vinylesters such as vinyl acetate, vinyl pivalate, vinyl neononanoate, vinyl neodecanoate, vinyl laurate, vinyl stearate or vinyl benzoate are also suitable.

The molecular weights obtainable on polymerization at room temperature in air are high and are in the range of values obtained during heat-activated radical chain polymerization. For example, the number-average and weight-average molecular weights of a methyl methacrylate polymerized in bulk at room temperature by 2.9 wt. % of the initiator composition according to the invention, after 24 hours, were Mn=170,000 and Mw=510,000 g/mole, with a polymer yield of 89%. Polymerization in polar solvents such as N,N-dimethylformamide (DMF), dimethylsulphoxide (DMSO), esters or ethers such as dioxane yielded similarly high molecular weights. On the other hand less polar solvents such as benzene, toluene or xylene mixtures are unsuitable as solvents, since no polymers form in them, even at high monomer concentrations of over 50 wt. %.

On the other hand α,β-unsaturated diesters such as the dialkyl esters of maleic and fumaric acid, vinyl ethers and vinyl aromatics are unsuitable for homopolymerization with the initiator composition according to the invention.

On the other hand, using the initiator composition according to the invention, the α,β-unsaturated esters in the group comprising acrylic acid, methacrylic acid and vinyl ester can be copolymerized both with one another and with the previously mentioned α,β-unsaturated diesters, resulting in copolymers which have not hitherto been obtainable industrially. According to the invention, therefore, on the one hand acrylic acid and methacrylic acid esters containing different alcohol radicals in the ester group can be copolymerized. On the other hand according to the invention these acrylic acid and methacrylic acid esters can also be copolymerized with vinylesters, vinylethers, maleic acid and fumaric acid diesters and with styrene. A precondition for copolymerization with the initiator compound according to the invention is the presence of an α,β-unsaturated ester component in the comonomer mixture. The proportion of α,β-unsaturated esters in the group comprising acrylic acid, methacrylic acid or vinyl ester can for example be 5 to 99 mole. %. Another possibility is copolymerization of vinylesters with vinylethers, maleic acid and fumaric acid esters and also with styrene. The content of vinylesters can be varied from 10 to 99, preferably 40 to 90 mole. %. The non-homopolymerizable maleic acid and fumaric acid diesters, when acted upon by the initiator composition according to the invention, can also copolymerize with methacrylates, acrylates, vinylethers, and vinyl aromatics, the proportion thereof in the comonomer mixture for copolymerization being 25 to 75 mole. %, preferably 40 to 60 mole %.

The following are examples of copolymerizable maleic acid and fumaric acid diesters: dimethyl maleate, diethyl maleate, di-n-butyl maleate, di-tert.butyl maleate, dicyclohexyl maleate and the corresponding fumarates. The vinyl ethers can be, for example, methylvinyl ether, ethylvinyl ether, n-butylvinyl ether or isobutylvinyl ether. Styrene, vinyl toluene or 4-tert.butyl styrene are examples of suitable vinyl aromatics.

The initiator composition according to the invention is also capable of crosslinking polyfunctional methacrylates and acrylates, either individually or in the form of a mixture of a number of polyfunctional unsaturated esters or a mixture with monofunctional methacrylic acid or acrylic acid esters in the temperature range from 0 to 70° C., particularly advantageously at room temperature, in a time of a few minutes to 24 hours in air. The composition can also harden mono- or polyfunctional methacrylates or acrylates in mixtures containing maleates or fumarates, vinylesters or mono- and polyfunctional vinylethers in the stated temperature range in air. It is also possible to add 0.1 to 30 wt. % of styrene or other vinyl aromatics. The crosslinking time depends on the total concentration of the initiator composition according to the invention in the crosslinkable mixture, and depends on the crosslinking temperature, which can be between 0 and 70° C. The nature and composition of the mono- and polyfunctional monomers and oligomers are variable over a wide range. By this means, thin lacquer coatings or thick boards or cast parts can be hardened in air at room temperature within a short time, completely and with a non-sticky surface.

The individual layers can have a thickness of, for example, 0.1 mm to 20 cm, preferably 1 mm to 5 cm.

The polymerizable compositions according to the invention as defined hereinbefore are crosslinking mixtures. The following are suitable monomer components of these crosslinking mixtures: the previously mentioned methacrylic and acrylic acid esters, vinylesters such as vinyl acetate, vinyl pivalate, vinyl neononanoate, vinyl neodecanoate, vinyl laurate, vinyl stearate or vinyl benzoate, and monofunctional vinyl ethers such as methylvinylether, ethylvinyl ether, n-butylvinyl ether or isobutylvinyl ether, and the previously mentioned maleic acid and fumaric acid diesters. Styrene, vinyl toluene or 4-tert.butyl styrene are examples of suitable vinyl aromatics.

The following are examples of suitable polyfunctional acrylates and methacrylates: the acrylic and methacrylic acid esters of ethylene glycol, propylene glycol-1,2 and -1,3, butanediol-1,3 and -1,4, hexanediol-1,6, trimethylol propane, pentaerythritol, or OH-terminal polyethers such polyethylene glycol, polypropylene glycol or polyetramethylene glycol. Also suitable are the reaction products of hydroxyalkyl acrylates and methacrylates with di- and polyglycidyl ethers, dicarboxylic acids, oligoesters and polyesters, di- and triisocyanates and isocyanate-functional polyurethane prepolymers and reaction products of acrylic and methacrylic acid with di- and polyglycidyl ethers. Products of this kind are commercially available and are used inter alia in lacquers which set when irradiated. The polyfunctional vinylethers can be, for example, diethyleneglycol divinyl ether, triethyleneglycol divinyl ether, cyclohexane dimethanol-1,4-divinyl ether or trimethylolpropane trivinyl ether.

The polymerizable compositions according to the invention, which depending on their formulation are self crosslinking mixtures or mixtures which crosslink when a suitable crosslinking agent is added, are produced by conventional methods in the polymer industry, such as solution, agitation or dispersion, optionally with addition of inactive adjuvant and aggregates. Immediately before crosslinking, the individual components of the initiator composition according to the invention are introduced in the following sequence: salt of the metal in the second sub-group of the periodic table, salt of the metal in the seventh or eighth sub-group of the periodic table and peroxy ester, the proportions by weight of active substance being for example 0.01 to 2 wt. % salt of the metal in the second sub-group of the periodic table, preferably the $Zn^{2+}$ salt, 0.01 to 2 wt. % of the salt of the metal in the seventh or eighth sub-group of the periodic table, preferably $Co^{2+}$ and/or $Mn^{2+}$ salt and 0.02 to 4 wt. % of peroxy ester relative to the monomer or monomers for crosslinking. Octoates of the said divalent metal, and a peroxy ester in the form of tert. butyl peroxybenzoate are particularly preferred for crosslinking the polyfunctional acrylate and methacrylate mixtures. Advantageously the metal salt solutions can be added during production of the mixtures for crosslinking, which will therefore be stable in storage for a longer period. In that case the peroxy ester will be added immediately before processing.

The mixtures are then applied by suitable methods in the form of a film or poured into suitable molds for producing boards and molded members and hardened at temperatures in the range from 0 to 70° C., preferably at room temperature. Only 12 hours after beginning of the crosslinking at room temperature, the conversion rate of crosslinked monomers is more than 93%. Brief heating to temperatures of 40° C. immediately after gelling ensures substantially quantitative conversion and immediately yields scratch- resistant surfaces.

Even thick layers can be crosslinked without a protective gas atmosphere and within a few minutes, so that in practical applications it is often necessary to prolong the gel time of these mixtures containing the initiator composition according to the invention to obtain processing times of practical use, i.e. from 15 to 60 minutes. The prolongation can be obtained, for example, by reducing the content of the salt of the metal in the second sub-group to 10 to 30 mole. % of the content of the salt of the metal in the seventh or eighth sub-group. For example, if the molar ratio of the salt of the metal in the second sub-group to the salt of the metal in the seventh or eighth sub-group, e.g. the molar ratio of $Zn^{2+}/Co^{2+}$, is reduced from 0.4/1 to 0.2/1, the crosslinking time of diethyleneglycol dimethacrylate at room temperature will be prolonged from 2 to 80 minutes. If the salt of the metal in the seventh or eighth sub-group is a cobalt salt, the proportion by weight of the Co salt solution containing 6 wt. % $Co^{2+}$, together with the peroxyester in the mixture for crosslinking, will be a total of 1.5 wt. %.

The invention therefore also provides use of the previously described polymerizable composition for producing acrylic glass parts, molded members, coatings, jointless flooring, repair lacquer coatings, priming coats, patching compounds, putty, fillers and adhesives.

Finally the invention also relates to a method of polymerizing unsaturated monomers, preferably α,β-unsaturated esters, at a temperature of 0 to 70° C., characterized in that the previously described initiator composition is used as the polymerization initiator.

As the preceding shows, by comparison with conventional redox-based initiator systems active at room temperature or photoinitiators, the initiator composition according to the invention has considerable industrial advantages, since comparable amounts of initiator can rapidly polymerize and crosslink methacrylates and acrylates at low temperatures, particularly advantageously at room temperature, and polymerization and crosslinking are not inhibited by atmospheric oxygen. Consequently polymerization can be carried out without a protective gas atmosphere or wax, over a large area in ambient air. Uniform polymerization throughout the layer is particularly advantageous, when the surfaces exposed to air become adhesive-free and firm more quickly than with conventional initiator systems. In contrast to photopolymerization and crosslinking, the layer can be given any desired thickness, and no additional energy in the form of UV light is required. The components of the initiator composition are characterized by high stability and easy accessibility. For example the particularly preferred tert. butyl peroxybenzoates can be stored at room temperature without cooling, which is not the case with ketone hydroperoxides, which are preferred for rapid crosslinking of unsaturated polyesters at room temperature.

As a result or the advantages as described, the initiator composition according to the invention has many possible applications. For example it can be used to make acrylic glass parts very quickly, continuously, and with large dimensions without complicated gas-atmosphere or temperature-control devices. Molded members, even with thick walls, can be cast in open molds. More particularly the novel initiator composition can be used to produce mechanically high-quality coatings which crosslink quickly at room temperature, using mono- or polyfunctional methacrylates, vinylesters, vinylethers and maleic acid or fumaric acid dialkylesters, which have low toxicity and often have little odor. Possible applications inter alia are to jointless flooring, repair lacquer coatings, primer coats, patching compounds, putty, fillers and adhesives.

The examples illustrate the invention. Use of the initiator composition according to the invention for polymerization and crosslinking of acrylates and methacrylates is described in particular.

EXAMPLE 1

0.03 g $Zn^{2+}$-2-ethyl hexanoate (Zn octoate) solution (Zn concentration 12% in xylene), 0.05 g of $Co^{2+}$-2-ethyl hexanoate (Co octoate) solution (Co concentration 6% in xylene) and 0.1 g tert. butyl peroxybenzoate were successively added in a 10 ml specimen glass containing 5 g methyl methacrylate and thoroughly mixed. The mixture was left to stand in the open glass at room temperature. After 24 hours the solid polymer was dissolved in 30 ml acetone and precipitated from methanol. The yield of polymethyl methacrylate after drying for 12 hours in vacuo was 92.4%.
Molecular weights: Mn=94,400 g/mole, Mw=555,600 g/mole.

EXAMPLE 2

A methyl methacrylate/initiator mixture as per Example 1 was left to stand at +3° C. in an open glass in a refrigerator for 24 hours. The viscous polymer solution was then precipitated in methanol. The yield of polymethyl methacrylate after drying for 12 hours in vacuo was 16.7%.
Molecular weights: Mn=29,540 g/mole, Mw=42,870 g/mole.

EXAMPLE 3

A methyl methacrylate/initiator mixture as per Example 1 was heated in air for 24 hours in a 25 ml round-bottom flask with reflux condenser at 70° C. The solid polymer was then dissolved in 30 ml acetone and precipitated from methanol. The yield of polymethyl methacrylate after drying for 12 hours in vacuo was 93.2%.
Molecular weights: Mn=16,000 g/mole, Mw=49,900 g/mole.

EXAMPLE 4

0.02 g Zn octoate solution (Zn concentration 12% in xylene), 0.04 g Co octoate solution (Co concentration 6% in xylene) and 0.1 g tert. butyl peroxybenzoate were successively added in a 10 ml specimen glass containing 5 g n-butyl acrylate and thoroughly mixed. The mixture was then left to stand in the open glass at room temperature. After 24 hours the highly viscous polymer was dissolved in 40 ml tetrahydrofuran and precipitated from methanol. The yield of poly-(n-butyl acrylate) after drying for 12 hours in vacuo was 91%.
Molecular weights: Mn=94,000 g/mole, Mw=663,200 g/mole.

EXAMPLE 5

0.05 g Zn octoate solution (Zn concentration 12% in xylene), 0.05 g Co octoate solution (Co concentration 6% in xylene) and 0.1 g tert. butyl peroxybenzoate were successively added in a 10 ml specimen glass containing 5 g vinyl acetate and thoroughly mixed. The mixture was then left to stand in the open glass at room temperature. After 24 hours the highly viscous polymer was dissolved in 20 ml tetrahydrofuran and precipitated from water. The yield of polyvinyl acetate after drying for 12 hours in vacuo was 76%.
Molecular weights: Mn=70,000 g/mole, Mw=250,000 g/mole.

EXAMPLE 6

0.05 g Zn octoate solution (Zn concentration 12% in xylene), 0.05 g Co octoate solution (Co concentration 6% in xylene) and 0.1 g tert. butyl peroxybenzoate were successively added in a 10 ml specimen glass containing 5 g styrene and thoroughly mixed. The mixture was then left to stand in the open glass at room temperature. After 24 hours the liquid mixture was dissolved in 20 ml tetrahydrofuran and precipitated from methanol. Only about 120 mg of a colorless oil precipitated, and was shown by gel-permeation chromatography against polystyrene standard to consist of styrene oligomers with molecular weights between 200 and 600 g/mole.

EXAMPLE 7

0.50 g Zn octoate solution (Zn concentration 8% in xylene), 0.60 g Co octoate solution (Co concentration 6% in xylene) and 1 g tert. butyl peroxybenzoate were added with agitation to a mixture of 50 g dimethylformamide and 50 g methyl methacrylate in a 250 ml round-bottom flask with magnetic rod agitator and then agitated in air at room temperature. After 48 hours the polymer was precipitated from methanol. The yield of polymethyl methacrylate after drying for 24 hours in vacuo was 85%.
Molecular weights: Mn=67,000 g/mole, Mw=283,000 g/mole.

EXAMPLE 8

0.50 g Zn octoate solution (Zn concentration 8% in xylene), 0.50 g $Mn^{2+}$ octoate solution (Mn concentration 6% in xylene) and 1 g tert. butyl peroxybenzoate were successively added to a mixture of 50 g dimethylformamide and 50 g n-butylacrylate in a 250 ml round-bottom flask with magnetic rod agitator and agitated at room temperature in air. After 48 hours the polymer was precipitated from methanol. The yield of poly-(n-butyl acrylate) after drying for 24 hours in vacuo was 92%.
Molecular weights: Mn=223,400 g/mole, Mw=630,000 g/mole.

EXAMPLE 9

0.09 g Zn octoate solution (Zn concentration 12% in xylene), 0.15 g Co octoate solution (Co concentration 6% in xylene) and 0.3 g tert. butyl peroxybenzoate were successively added in a 20 ml specimen glass containing 7.4 g (0.074 mole) methyl methacrylate and 7.6 g (0.073 mole) styrene and thoroughly mixed. The mixture was then heat-treated at 50° C. in the open glass. After 24 hours the viscous resin was dissolved in 30 ml acetone and precipitated from methanol. The yield of copolymer after drying for 12 hours in vacuo was 31.8%.
Molecular weights: Mn=7,100 g/mole, Mw=144,400 g/mole.
The composition of the polymer determined by NMR spectroscopy was 0.7 mole methyl methacrylate/1 mole styrene.

EXAMPLE 10

0.03 g Zn octoate solution (Zn concentration 12% in xylene), 0.05 g Co octoate solution (Co concentration 6% in xylene) and 0. 1 g tert. butyl peroxybenzoate were successively added in a 20 ml specimen glass containing 2.2 g (0.022 mole) methyl methacrylate and 2.8 g (0.022 mole) n-butyl acrylate and thoroughly mixed. The mixture was then heat-treated at 50° C. in the open glass. After 24 hours the viscous resin was dissolved in 30 ml acetone and precipitated from methanol. The yield of copolymer after drying for 12 hours in vacuo was 88.1%.
Molecular weights: Mn=95,300 g/mole, Mw=338,300 g/mole.
The composition of the polymer, determined by NMR spectroscopy, was 1.27 mole methyl methacrylate/1 mole n-butyl acrylate.

EXAMPLE 11

0.05 g Zn octoate solution (Zn concentration 8% in xylene), 0.05 g Co octoate solution (Co concentration 6% in xylene) and 0.1 g tert. butyl peroxybenzoate were successively added with agitation to a 50 ml round-bottom flask with magnetic rod agitator and containing a mixture of 4 g dimethylformamide, 2.5 g (0.025 mole) methyl methacrylate and 2.7 g (0.026 mole) styrene and then agitated at room temperature in air. After 48 hours the polymer was precipitated from methanol. The yield of copolymer after drying for 24 hours in vacuo was 56%.
Molecular weights: Mn=115,400 g/mole, Mw=234,300 g/mole.
The composition of the polymer determined by NMR spectroscopy was 0.7 mole methyl methacrylate/1 mole styrene.

EXAMPLE 12

0.6 g Zn octoate solution (Zn concentration 8% in xylene), 0.6 g Co octoate solution (Co concentration 6% in xylene) and 1.2 g tert. butyl peroxybenzoate were successively added with agitation to a 100 ml round-bottom flask with magnetic rod agitator and containing a mixture of 40 g dimethylformamide, 32 g (0.25 mole) n-butyl acrylate and 27 g (0.26 mole) styrene and agitated at room temperature in air. After 48 hours the polymer was precipitated from methanol. The yield of copolymer after drying for 24 hours in vacuo was 84%.
Molecular weights: Mn=174,500 g/mole, Mw=382,000 g/mole.
The composition determined by NMR spectroscopy of the polymer was 0.7 mole n-butyl acrylate/1 mole styrene.

EXAMPLE 13

0.03 g Zn octoate solution (Zn concentration 12% in xylene), 0.05 g Co octoate solution (Co concentration 6% in xylene) and 0.1 g tert. butyl peroxybenzoate were successively added in a 20 ml specimen glass containing 3.3 g (0.025 mole) butyl methacrylate and 1.7 g (0.025 mole) ethylvinyl ether and thoroughly mixed. The mixture was left to stand in the open glass at room temperature. After 24 hours the viscous resin was dissolved in 30 ml acetone and precipitated from a methanol/water mixture (1:1). The yield of copolymer after drying for 12 hours in vacuo was 38.6%.
Molecular weights: Mn=20,100 g/mole, Mw=46,400 g/mole.
The composition of the polymer determined by NMR spectroscopy was 8.62 mole butyl methacrylate/1 mole ethylvinyl ether.

EXAMPLE 14

0.03 g Zn octoate solution (Zn concentration 12% in xylene), 0.05 g Co octoate solution (Co concentration 6% in xylene) and 0.1 g tert. butyl peroxybenzoate were successively added and thoroughly mixed in a 20 ml specimen glass containing 3.2 g (0.025 mole) butyl acrylate and 1.8 g (0.025 mole) ethylvinyl ether. The mixture was left to stand in the open glass at room 20 temperature. After 24 hours the viscous resin was dissolved in 30 ml tetrahydrofuran and precipitated from a methanol/water mixture (1:1). The yield of copolymer after drying for 12 hours in vacuo was 67.3%. Molecular weights: Mn=54,800 g/mole, Mw=114,000 g/mole.

The composition of the polymer determined by NMR spectroscopy was 4.15 mole butyl acrylate/1 mole ethylvinyl ether.

EXAMPLE 15

0.03 g Zn octoate solution (Zn concentration 12% in xylene), 0.05 g Co octoate solution (Co concentration 6% in xylene) and 0.1 g tert. butyl peroxybenzoate were successively added and thoroughly mixed in a 20-ml specimen glass containing 1.0 g (0.008 mole) butyl acrylate and 4.0 g (0.023 mole) diethyl maleate. The mixture was left to stand in the open glass at room temperature. After 24 hours the viscous resin was dissolved in 30 ml tetrahydrofuran and precipitated from a methanol/water mixture (1:1). The yield of copolymer after drying for 12 hours in vacuo was 37.4%. Molecular weights: Mn=56,800 g/mole, Mw=321,600 g/mole.

The composition determined by NMR spectroscopy of the polymer was 8.1 mole butyl acrylate/1 mole diethyl maleate.

EXAMPLE 16

0.03 g Zn octoate solution (Zn concentration 12% in xylene), 0.05 g Co octoate solution (Co concentration 6% in xylene) and 0.1 g tert. butyl peroxybenzoate were successively added and thoroughly mixed in a 20 ml specimen glass containing 1.7 g (0.019 mole) vinyl acetate and 3.3 g (0.019 mole) diethyl maleate. The mixture was left to stand at room temperature in the open glass. After 24 hours the viscous resin was dissolved in 30 ml tetrahydrofuran and precipitated from a methanol/water mixture (1:1). The yield of copolymer after drying for 12 hours in vacuo was 53.8%. Molecular weights: Mn=93,500 g/mole, Mw=284,400 g/mole.

The composition of the polymer determined by NMR spectroscopy was 1.09 mole diethyl maleate/1 mole vinyl acetate.

EXAMPLE 17

0.03 g Zn octoate solution (Zn concentration 12% in xylene), 0.05 g Co octoate solution (Co concentration 6% in xylene) and 0.1 g tert. butyl peroxybenzoate were added and thoroughly mixed in a 20 ml specimen glass containing 4.1 g (0.048 mole) vinyl acetate and 0.9 g (0.005 mole) diethyl maleate. The mixture was left to stand in the open glass at room temperature. After 24 hours the viscous resin was dissolved in 30 ml tetrahydrofuran and precipitated from a methanol/water mixture (1:1). The yield of copolymer after drying for 12 hours in vacuo was 42.6%. Molecular weights: Mn=70,700 g/mole, Mw=257,400 g/mole.

The composition of the polymer determined by NMR spectroscopy was 6.03 mole vinyl acetate/1 mole diethyl maleate.

EXAMPLE 18

0.04 g $Cd^{2+}$-2-ethyl hexanoate (Cd octoate) solution (Cd concentration 8% in xylene), 0.05 g Co octoate solution (Co concentration 6% in xylene) and 0.1 g tert. butyl peroxybenzoate were successively added and thoroughly mixed in a 20 ml specimen glass containing 2.7 g (0.032 mole) vinyl acetate and 2.3 g (0.032 mole) ethylvinyl ether. The mixture was left to stand in the open glass at room temperature. After 24 hours the viscous resin was dissolved in 30 ml tetrahydrofuran and precipitated from a methanol/water mixture (1:1). The yield of copolymer after drying for 12 hours in vacuo was 37.3%.
Molecular weights: Mn=2,900 g/mole, Mw=6,100 g/mole.

The composition determined by NMR spectroscopy of the polymer was 2.93 mole vinyl acetate/1 mole ethylvinyl ether.

EXAMPLE 19

0.03 g Zn octoate solution (Zn concentration 12% in xylene), 0.05 g Co octoate solution (Co concentration 6% in xylene) and 0.1 g tert. butyl peroxybenzoate were successively added and thoroughly mixed in a 20 ml specimen glass containing 1.5 g (0.021 mole) ethylvinyl ether and 3.1 g (0.018 mole) diethyl maleate. The mixture was left to stand in the open glass at room temperature. After 24 hours the viscous resin was precipitated from a methanol/water mixture (1:1). The yield of copolymer after drying for 12 hours in vacuo was 49.8%.
Molecular weights: Mn=3,900 g/mole, Mw=13,800 g/mole.

The composition of the polymer determined by NMR spectroscopy was 1.63 mole diethyl maleate/1 mole ethylvinyl ether.

EXAMPLE 20

0.03 g Zn octoate solution (Zn concentration 12% in xylene), 0.05 g Co octoate solution (Co concentration 6% in xylene) and 0.1 g tert. butyl peroxybenzoate were successively added and thoroughly mixed in a 20 ml specimen glass containing 1.9 g (0.018 mole) styrene and 3.1 (0.018 mole) diethyl maleate. The mixture was left to stand in the open glass at room temperature. After 24 hours the viscous resin was precipitated from a methanol/water mixture (1:1). The yield of copolymer after drying for 12 hours in vacuo was 25%.
Molecular weights: Mn=14,500 g/mole, Mw=35,000 g/mole.

The composition of the polymer determined by NMR spectroscopy was 11.7 mole styrene/1 mole diethyl maleate.

EXAMPLE 21

0.03 g Zn octoate solution (Zn concentration 12% in xylene), 0.05 g Co octoate solution (Co concentration 6% in xylene) and 0.1 g tert butyl peroxybenzoate were successively added and thoroughly mixed in a 20 ml specimen glass containing 1.9 g (0.018 mole) styrene and 3.1 g (0.018 mole) diethyl fumarate. The mixture was then left to stand in the open glass at room temperature. After 24 hours the viscous resin was precipitated from a methanol/water mixture (1:1). The yield of copolymer after drying for 12 hours in vacuo was 57%.
Molecular weights: Mn=25,600 g/mole, Mw=51,000 g/mole.

The composition of the polymer, determined by NMR spectroscopy, was 1.25 mole styrene/1 mole diethyl fumarate.

EXAMPLE 22

0.03 g Zn octoate solution (Zn concentration 12% in xylene), 0.05 g Co octoate solution -20 (Co concentration 6% in xylene) and 0.1 g tert. butyl peroxybenzoate were successively added and thoroughly mixed in a 20 ml specimen glass containing 1.7 g (0.019 mole) vinyl acetate and 3.3 g (0.019 mole) diethyl fumarate. The mixture was left to stand in the open glass at room temperature. After 24 hours the viscous resin was precipitated from a methanol/water mixture (1:1). The yield of copolymer after drying for 12 hours in vacuo was 59.7%.

Molecular weights: Mn=18,700 g/mole, Mw=39,600 g/mole.

The composition of the polymer, determined by NMR spectroscopy, was 1.06 mole diethyl fumarate/1 mole vinyl acetate.

EXAMPLE 23

5 g diethyleneglycol dimethacrylate was poured into respective 10 ml specimen glasses and the following initiator components were successively added:

a) 0.05 g Zn octoate (Zn concentration 8% in xylene),
   0.05 g Co octoate (Co concentration 6% in xylene),
   0.1 g tert. butyl peroxybenzoate,
b) 0.05 g Zn octoate (Zn concentration 8% in xylene),
   0.05 g Co octoate (Co concentration 6% in xylene),
   0.1 g tert. butyl diethyl acetate,
c) 0.05 g Zn octoate (Zn concentration 8% in xylene)
   0.05 g Mn octoate (Mn concentration 6% in xylene)
   0.1 g tert. butyl peroxybenzoate.

Mixtures a)–c) were thoroughly mixed, left to stand at room temperature, and the time until complete hardening throughout the layer (about 2 cm) was measured. This time was defined as the crosslinking time. The measured results are:
a) 3 min 20 sec;
b) 5 min 10 sec;
c) 6 min 30 sec.

EXAMPLE 24

10 g diethyleneglycol dimethacrylate was poured into respective 20 ml specimen glasses and the following initiator components were successively added:

a) 0.008 g Zn octoate (Zn concentration 12% in xylene),
   0.009 g Co octoate (Co concentration 6% in xylene),
   0.026 g tert. butyl peroxybenzoate, total amount: 0.35 wt. %;
b) 0.0165 g Zn octoate (Zn concentration 12% in xylene),
   0.009 g Co octoate (Co concentration 6% in xylene),
   0.053 g tert. butyl peroxybenzoate, total amount: 0.71 wt. %;
c) 0.0245 g Zn octoate (Zn concentration 12% in xylene),
   0.027 g Co octoate (Co concentration 6% in xylene),
   0.078 g tert. butyl peroxybenzoate, total amount: 1.03 wt %;
d) 0.0338 g Zn octoate (Zn concentration 12% in xylene),
   0.0372 g Co octoate (Co concentration 6% in xylene),
   0.106 g tert. butyl peroxybenzoate, total amount: 1.41 wt. %;
e) 0.043 g Zn octoate (Zn concentration 12% in xylene),
   0.048 g Co octoate (Co concentration 6% in xylene),
   0.120 g tert. butyl peroxybenzoate, total amount: 1.7 wt. %.

The thickness of the layers of mixture was about 5 cm. Mixtures a)–e) were examined as described in Example 23. The measured crosslinking times were:

| | | |
|---|---|---|
| a) 80 min | b) 30 min 5 sec | c) 10 min 10 sec |
| d) 4 min 45 sec | e) 3 min 20 sec. | |

18–24 hours after crosslinking, gel fractions of the specimens were determined, by comminuting the polymer blocks and weighing 2–2.5 g exactly in a metal sieve in each case and storing for 24 hours in acetone. After drying in vacuo, the undissolved substance was again weighed. The difference from the weight before extraction with acetone constituted the gel fraction. This was always above 95% in a)–e).

EXAMPLE 25

Mixtures a)–c) in Example 24 were heat-treated at 50° C. and the crosslinking time was measured. The crosslinking times were: a) 26 min 30 sec; b) 5 min 30 sec; c) 3 min. The gel fractions, measured as in Example 24, were above 93% in all cases.

EXAMPLE 26

5 g respectively of the mixtures a)–e) in example 24 were applied in 2 mm thick layers to aluminum plates and crosslinked at room temperature. The crosslinking times up to complete hardening were:

| | | | | |
|---|---|---|---|---|
| a) <24 n | b) 2.3 n | c) 33 min | d) 7 min 15 sec | e) 4 min 5 sec |

EXAMPLE 27

5.2 g of a mixture consisting of 25 g diethyleneglycol dimethacrylate and 0.50 g Zn octoate solution (Zn concentration 8% in xylene) and 0.50 g Co octoate (Co concentration 6% in xylene) was poured into respective 10 ml specimen glasses and mixed in each case with 0.1 g tert. butyl peroxybenzoate. The crosslinking times were measured at various temperatures:

| | |
|---|---|
| a) 3° C.: 7 min 30 sec | b) room temperature: (24° C.): 3 min 40 sec |
| c) 40° C.: 40 sec | d) 70° C.: 10 sec. |

All gel fractions measured as in Example 24 were above 95%.

EXAMPLE 28

5 g diethyleneglycol dimethacrylate was poured into respective 10 ml specimen glasses, 0.05 g Co octoate (Co concentration 6% in xylene) was added in each case, and the substance was mixed with the following quantities of Zn octoate (Zn concentration 8% in xylene):

| | |
|---|---|
| a) 0.0076 g (0.076 wt. %) | b) 0.0163 g (0.163 wt. %) |
| c) 0.325 g (0.325 wt. %) | d) 0.0494 g (0.494 wt. %) |
| e) 0.0736 g (0.736 wt. %). | |

0.1 g tert. butyl peroxybenzoate was added to each mixture and the crosslinking times at room temperature were measured:

a) 80 min  b) 5 min 30 sec  c) 2 min 35 sec  d) 1 min 47 sec  e) 50 sec.

All the gel fractions measured as in Example 24 were above 95%.

EXAMPLE 29 b 10g hexanediol-1,6-diacrylate was poured into respective 20 ml specimen glasses and the following initiator components were successively added:
a) 0.0154 g Zn octoate (Zn concentration 12% in xylene),
   0.019 g Co octoate (Co concentration 6% in xylene),
   0.0437 g tert. butyl peroxybenzoate, total amount: 0.17 wt. %;
b) 0.0245 g Zn octoate (Zn concentration 12% in xylene),
   0.029 g Co octoate (Co concentration 6% in xylene),
   0.065 g tert. butyl peroxybenzoate, total amount: 0.27 wt. %;
c) 0.0510 g Zn octoate (Zn concentration 12% in xylene),
   0.0924 g Co octoate (Co concentration 6% xylene),
   0.181 g tert. butyl peroxybenzoate, total amount: 0.70 wt. %;

The height of each layer of mixture was about 5 cm. Mixtures a)–c) were crosslinked at room temperature as described in Example 23. The crosslinking times were:

a) 4 min 30 sec   b) 2 min   c) 10 sec (very exothermic reaction).

All gel fractions measured as in Example 24 were above 99%.

EXAMPLE 30

Mixtures as per Example 29b) were each heat-treated at 13° C. and 50° C. and the crosslinking times were measured as follows:

a) 13° C.: 4 min   b) 50° C.: 1 min.

All gel fractions measured as in Example 24 were above 99%.

EXAMPLE 31

A mixture of 2.4 g Zn octoate solution (Zn concentration 12% in xylene) and 2.0 g Co octoate (Co concentration 6% in xylene) was added to a solution of 50 g polymethyl methacrylate in 50 g diethyleneglycol dimethacrylate and 100 g methyl methacrylate. 4 g tert. butyl peroxybenzoate was stirred into the mixture and the viscous resin was poured into a metal mold 5 cm high sprayed before with an anti-adhesive substance. After 6 hours at room temperature the material had completely hardened, the surface was non-sticky and the block could be removed from the mold. The polymer block was sawn into 25 parts, and the gel fraction of each part was determined as in Example 24. The gel fractions were all above 99%.

EXAMPLE 32

Various quantities of triethyleneglycol divinylether (TEGDVE) and diethyl maleate (DEM) were weighed in 10 ml specimen glasses, the total amount being 5 g in each case. The molar ratio of vinyl ether to maleate groups was varied between 2:1 and 1:2. A mixture of 0.05 g Zn octoate solution (Zn concentration 8% in xylene) and 0.05 g Co octoate (Co concentration 6% in xylene) was added to each mixture, which was mixed with 0.1 g tert. butyl peroxybenzoate in each case. The crosslinking times were measured at room temperature.
a) 2.70 g TEGDVE, 2.30 g DEM (2:1 m/m)
b) 2.34 g TEGDVE, 2.66 g DEM (1.5:1 m/m)
c) 1.85 g TEGDVE, 3.15 g DEM (1:1 m/m)
d) 1.54 g TEGDVE, 3.46 g DEM (1:1.33 m/m)
e) 1.14 g TEGDVE, 3.86 g DEM (2:1 m/m).

The measured crosslinking times up to complete hardening were:

a) 1 min 5 sec   b) 1 min 15 sec   c) 1 min 25 sec
d) 2 min 10 sec  e) 4 min 45 sec).

The gel fractions were over 95%.

EXAMPLE 33

Varying amounts of triethyleneglycol divinylether (TEGDVE) and diethyl fumarate (DEF) were weighed in 10 ml specimen glasses, the total quantity being 5 g in each case. The molar ratio of vinyl ether to maleate groups was varied between 2:1 and 1:2. A mixture of 0.05 g Zn octoate solution (Zn concentration 8% in xylene) and 0.05 g Co octoate (Co concentration 6% in xylene) was added to each mixture, which was mixed with 0.1 g tert. butylperoxybenzoate in each case. The crosslinking times at room temperature were measured.
a) 2.70 g TEGDVE, 2.30 g DEF (2:1 m/m)
b) 2.34 g TEGDVE, 2.66 g DEF (1.5:1 m/m)
c) 1.85 g TEGDVE, 3.15 g DEF (1:1 m/m)
d) 1.54 g TEGDVE, 3.46 g DEF (1:1.33 m/m)
e) 1.14 g TEGDVE, 3.86 g DEF (2:1 m/m).

The measured crosslinking times up to complete hardening were:

a) 5 min         b) 5 min 25 sec   c) 10 min 15 sec
d) 17 min 30 sec  e) 50 min 25 sec.

The gel fractions were all above 93%.

EXAMPLE 34

A mixture of 1.85 g triethyleneglycol divinylether (TEGDVE) and 3.46 g diethyl maleate (DEM) was poured into a 10 ml specimen glass and the following initiator combination was mixed therein:
a) 0.02 g Zn octoate solution (Zn concentration 12% in xylene),
   0.02 g Co octoate (Co concentration 6% in xylene,
   0.04 tert. butyl peroxybenzoate.

The prepared mixture in the specimen glass had a layer thickness of about 2 cm. It was stored at room temperature and its crosslinking properties were observed.
a) Crosslinking time: 7 min. to complete hardening.

What is claimed is:
1. An initiator composition for polymerizing unsaturated monomers, comprising a component (A) which is a mixture of i) at least one salt of a metal in the second sub-group of the periodic table, optionally in solution in an aromatic solvent or in an α,β-unsaturated ester, and ii) at least one salt of a metal in the seventh and eighth sub-group of the periodic table, optionally in solution in an aromatic solvent or in an α,β-unsaturated ester; and a component (B) which is at least one organic peroxy ester, wherein the components (A) and (B) are kept separate from one another until they are brought together to initiate polymerization of the unsaturated monomers.

2. An initiator composition according to claim 1, wherein the salt of the metal in the second sub-group of the periodic table is a zinc salt.

3. An initiator composition according to claim 1, wherein the salt of the metal in the seventh sub-group is a manganese salt.

4. An initiator composition according to claim 2, wherein the salt of the metal in the seventh sub-group is a manganese salt.

5. An initiator composition according to claim 1, wherein the salt of the metal in the eighth sub-group is a cobalt salt.

6. An initiator composition according to claim 2, wherein the salt of the metal in the eighth sub-group is a cobalt salt.

7. An initiator composition according to claim 1, wherein the metal salt is a carboxylate.

8. An initiator composition according to claim 2, wherein the metal salt is a carboxylate.

9. An initiator composition according to claim 3, wherein the metal salt is a carboxylate.

10. An initiator composition according to claim 4, wherein the metal salt is a carboxylate.

11. An initiator composition according to claim 5, wherein the metal salt is a carboxylate.

12. An initiator composition according to claim 6, wherein the metal salt is a carboxylate.

13. An initiator composition according to claim 1, wherein the metal salt is an octoate.

14. An initiator composition according to claim 2, wherein the metal salt is an octoate.

15. An initiator composition according to claim 3, wherein the metal salt is an octoate.

16. An initiator composition according to claim 4, wherein the metal salt is an octoate.

17. An initiator composition according to claim 5, wherein the metal salt is an octoate.

18. An initiator composition according to claim 6, wherein the metal salt is an octoate.

19. An initiator composition according to claim 1, wherein the organic peroxy ester is tert. butyl peroxybenzoate.

20. An initiator composition according to claim 2, wherein the organic peroxy ester is tert. butyl peroxybenzoate.

21. An initiator composition according to claim 3, wherein the organic peroxy ester is tert. butyl peroxybenzoate.

22. An initiator composition according to claim 4, wherein the organic peroxy ester is tert. butyl peroxybenzoate.

23. An initiator composition according to claim 5, wherein the organic peroxy ester is tert. butyl peroxybenzoate.

24. An initiator composition according to claim 6, wherein the organic peroxy ester is tert. butyl peroxybenzoate.

25. A polymerizable composition comprising a first component in the form of a mixture of i) at least one polymerizable unsaturated monomer, ii) at least one salt of a metal in the second sub-group of the periodic table, and iii) at least one salt of a metal in the seventh or eighth sub-group of the periodic table; and a second component in the form of an organic peroxy ester, the first component and the second component being kept separate from one another until they are brought together to initiate polymerization of the unsaturated monomers.

26. A polymerizable composition according to claim 25, wherein the salt of the metal in the second sub-group of the periodic table is a zinc salt.

27. A polymerizable composition according to claim 25, wherein the salt of the metal in the seventh sub-group is a manganese salt.

28. A polymerizable composition according to claim 26, wherein the salt of the metal in the seventh sub-group is a manganese salt.

29. A polymerizable composition according to claim 25, wherein the salt of the metal in the eighth sub-group is a cobalt salt.

30. A polymerizable composition according to claim 26, wherein the salt of the metal in the eighth sub-group is a cobalt salt.

31. A polymerizable composition according to claim 25, wherein the metal salt is a carboxylate.

32. A polymerizable composition according to claim 26, wherein the metal salt is a carboxylate.

33. A polymerizable composition according to claim 25, wherein the metal salt is an octoate.

34. A polymerizable composition according to claim 26, wherein the metal salt is an octoate.

35. A polymerizable composition according to claim 25, wherein the organic peroxy ester is tert. butyl peroxybenzoate.

36. A polymerizable composition according to claim 26, wherein the organic peroxy ester is tert. butyl peroxybenzoate.

37. A polymerizable composition according to claim 25, wherein the polymerizable unsaturated monomer is at least one monomer selected from the group comprising the methacrylates, acrylates and vinylesters.

38. A polymerizable composition according to claim 26, wherein the polymerizable unsaturated monomer is at least one monomer selected from the group comprising the methacrylates, acrylates and vinylesters.

39. A method of polymerizing unsaturated monomers at a temperature of 0 to 70° C., wherein the initiator composition according to claim 1 is used as a polymerization initiator.

40. A method according to claim 39, wherein i) first the salt of the metal in the second sub-group of the periodic table ii) then the salt of the metal of the seventh and eighth sub-group of the periodic table and iii) finally the organic peroxy ester is added to the unsaturated monomer.

41. A method according to claim 39, comprising at least one polymerizable unsaturated monomer selected from the group consisting of methacrylates, acrylates and vinylesters.

42. A method according to claim 40, comprising at least one polymerizable unsaturated monomer selected from the group consisting of methacrylates, acrylates and vinylesters.

43. A method according to claim 39, wherein the method is carried under an air atmosphere.

* * * * *